United States Patent
Kapadia

(10) Patent No.: US 10,562,717 B2
(45) Date of Patent: *Feb. 18, 2020

(54) CONVEYOR COMBINER SYSTEM AND METHOD FOR AUTOMATED PRESCRIPTION FULFILLMENT

(71) Applicant: Humana Inc., Louisville, KY (US)

(72) Inventor: Atin Kapadia, Chandler, AZ (US)

(73) Assignee: Humana Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,083

(22) Filed: Jan. 14, 2019

(65) Prior Publication Data

US 2019/0144214 A1   May 16, 2019

Related U.S. Application Data

(63) Continuation of application No. 15/455,606, filed on Mar. 10, 2017, now Pat. No. 10,179,706.

(51) Int. Cl.
*B65G 47/70* (2006.01)
*B65G 47/68* (2006.01)

(52) U.S. Cl.
CPC .......... *B65G 47/70* (2013.01); *B65G 47/682* (2013.01)

(58) Field of Classification Search
None
See application file for complete search history.

(56) References Cited

U.S. PATENT DOCUMENTS

| | | |
|---|---|---|
| 2,315,880 A | 4/1943 | Stiles |
| 2,389,696 A | 11/1945 | Stiles |
| 2,560,995 A | 7/1951 | Stiles |
| 3,044,604 A | 7/1962 | Steigleder |
| 3,615,001 A | 10/1971 | Temple |
| 3,673,967 A | 7/1972 | Kropf |
| 3,895,716 A | 7/1975 | Ugo |
| 4,003,466 A | 1/1977 | Muth et al. |
| 4,401,207 A | 8/1983 | Garvey |
| 5,161,665 A | 11/1992 | Cragun |
| 6,304,797 B1 | 10/2001 | Shusterman |
| 6,516,938 B1 | 2/2003 | Paselsky et al. |
| 6,575,287 B2 | 6/2003 | Garvey et al. |
| 6,612,425 B1 | 9/2003 | Garvey |
| 6,648,124 B1 | 11/2003 | Garvey |
| 6,959,802 B1 | 11/2005 | Garvey |
| 6,964,329 B1 | 11/2005 | DiBianca et al. |
| 7,252,186 B2 | 8/2007 | Paquin et al. |

(Continued)

FOREIGN PATENT DOCUMENTS

DE   4412686 A1   10/1995

*Primary Examiner* — William R Harp
(74) *Attorney, Agent, or Firm* — Standley Law Group LLP

(57) ABSTRACT

An automated method and system for transporting vials from multiple upstream locations to a downstream location and for combining N number of conveyor lanes from N number of upstream location (e.g., capping stations) down to one conveyor lane. The system is adapted to transport vials from a more-distant upstream location faster than vials from a closer upstream location so that they reach the downstream location at approximately the same time. Guide members placed at an angle to the traveling axis of the conveyor lanes divert the vials onto a single conveyor lane for transporting the vials to a downstream location.

12 Claims, 3 Drawing Sheets

(56) References Cited

U.S. PATENT DOCUMENTS

| | | |
|---|---|---|
| 7,322,459 B2 | 1/2008 | Garvey |
| 7,556,777 B2 | 7/2009 | Victor |
| 7,617,926 B2 | 11/2009 | Jacob et al. |
| 9,714,144 B2 | 7/2017 | Earling et al. |
| 9,741,197 B2 | 8/2017 | Ghouri et al. |
| 9,845,201 B1 | 12/2017 | Trinh |
| 10,179,706 B2 * | 1/2019 | Kapadia ............... B65G 47/682 |
| 2003/0106772 A1 | 6/2003 | Garvey |
| 2007/0010910 A1 | 1/2007 | Pinney et al. |
| 2008/0059228 A1 | 3/2008 | Bossi et al. |
| 2008/0119958 A1 | 5/2008 | Bear et al. |
| 2011/0133948 A1 | 6/2011 | Ervin |
| 2015/0169846 A1 | 6/2015 | Pedrazzini |
| 2016/0209438 A1 | 7/2016 | Savonsalmi et al. |

\* cited by examiner

CONVEYOR COMBINER SYSTEM AND METHOD FOR AUTOMATED PRESCRIPTION FULFILLMENT

CROSS-REFERENCE TO RELATED APPLICATIONS

This application is a continuation of U.S. application Ser. No. 15/455,606, filed Mar. 10, 2017, the content of which is hereby incorporated by reference as if fully recited herein.

BACKGROUND

The present invention is directed to the field of automated dispensing systems, more particularly to the transport of objects such as pharmacy bottles/vials through an automated dispensing system. The present invention relates to an automated method and system for transporting vials from multiple upstream locations to a downstream location and for combining N number of conveyor lanes from N number of upstream locations (e.g., capping stations) down to one conveyor lane. The system is adapted to transport vials from a more-distant upstream location faster than vials from a closer upstream location so that they reach the downstream location at approximately the same time. Guide members placed at an angle to the traveling axis of the conveyor lanes divert the vials onto a single conveyor lane for transporting the vials to a downstream location.

Many health benefit plan providers and retail pharmacies offer their clients the option of obtaining prescription drugs by mail. Mail order pharmacies ship prescription drugs to a client's home so the client is not required to visit a pharmacy to fill a prescription in person. For clients with chronic conditions or other health conditions that require maintenance drugs, a mail order prescription program is an attractive benefit because it is more convenient for the clients and typically less expensive than obtaining prescription drugs at a neighborhood pharmacy.

Most mail order pharmacies use automated systems and dispensing lines to process and ship a high volume of prescriptions on a daily basis. Each prescription medication is typically dispensed into a vial or other container labeled with data from an electronic order that identifies the patient, drug (e.g., by NDC), dosage, and quantity. Each medication is dispensed in its own vial and in many instances, multiple vials are combined into a single package and shipped to a single address for a client with one or more chronic conditions requiring multiple medications. The automated dispensing system, therefore, must be intelligent and capable of determining which vials should be combined into a single package. The system must also be capable of routing the vials through the system to their appropriate destinations. Sensors deployed at many locations along the system detect the prescription information on the bottles along with RF ID tag information to intelligently route and divert the vials to the appropriate conveyor or destination. If the vial is to be combined with other vials (multi-vial order), the vials are sorted and grouped together, preferably towards the end of the dispensing line. The vials are ultimately routed to the final location for packaging and mailing to the consumer.

Automated dispensing lines typically comprise multiple sorting stations and therefore, require functionality to route and divert vials to the appropriate station. The process of routing and diverting vials for sorting and consolidation as well as other reasons can increase vial travel and processing time.

Depending upon how the technology is implemented and deployed within a mail order pharmacy, a substantial number of steps in the fulfillment process may be automated and the need for human intervention minimized. Transporting bottles through the automated dispensing lines in an efficient, timely, accurately, and consistent manner is crucial for filling the high volume of mail order prescriptions.

The present invention relates to a vial conveyor combiner system for combining N number of conveyor lanes from N number of upstream (e.g., capping stations) down to one conveyor lane for feeding a sorter machine (the sorter combines multiple vials of an order together into a group).

SUMMARY OF THE GENERAL INVENTIVE CONCEPT

In one embodiment of the invention, the invention is comprised of: a first upstream vial processing station; a second upstream vial processing station positioned next to the first upstream vial processing station, wherein the second upstream vial processing station is closer to the downstream location than the first upstream vial processing station; a third upstream vial processing station positioned next to the second upstream vial processing station, wherein the third upstream vial processing station is closer to the downstream location than the second upstream vial processing station; a first conveyor lane for transporting vials from the first upstream vial processing station to the downstream location; a second conveyor lane for transporting vials from the second upstream vial processing station to the downstream location; a third conveyor lane for transporting vials from the third upstream vial processing station to the downstream location; wherein the first, second, and third conveyor lanes are placed in a parallel arrangement with respect to each other; wherein the vial conveyor system is further comprised of: a single conveyor lane arranged so that the single conveyor lane moves in the same direction as the first, second, and third conveyor lanes; a first guide member placed at an angle to the traveling axis of the first conveyor lane for diverting vials traveling on the first conveyor lane onto the single conveyor lane; a second guide member placed at an angle to the traveling axis of the second conveyor lane for diverting vials traveling on the second conveyor lane onto the single conveyor lane; a third guide member placed at an angle to the traveling axis of the third conveyor lane for diverting vials traveling on the third conveyor lane onto the single conveyor lane.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the exemplary embodiments refers to the accompanying FIGURES that form a part thereof. The detailed description provides explanations by way of exemplary embodiments. It is to be understood that other embodiments may be used having mechanical and electrical changes that incorporate the scope of the present invention without departing from the spirit of the invention.

Typically, in an automated pharmacy system, after vials are filled and capped, the vials are placed on conveyors for transport to the next stage of the system. In the present invention, vials leaving the capper stations 24 are fed into a vial conveyor combiner system 26 for combining N number of conveyor lanes from N number of capper stations down to one conveyor lane for feeding a downstream sorter location (a sorter groups vials of a multi-vial order together, and it is desirable that vials of a multi-vail order reach the downstream sorter location at approximately the same time to avoid sorter logjams). In one embodiment of the invention, there are 6 conveyor lanes from the capper stations that feed the vial conveyor combiner system.

Figure 1A:
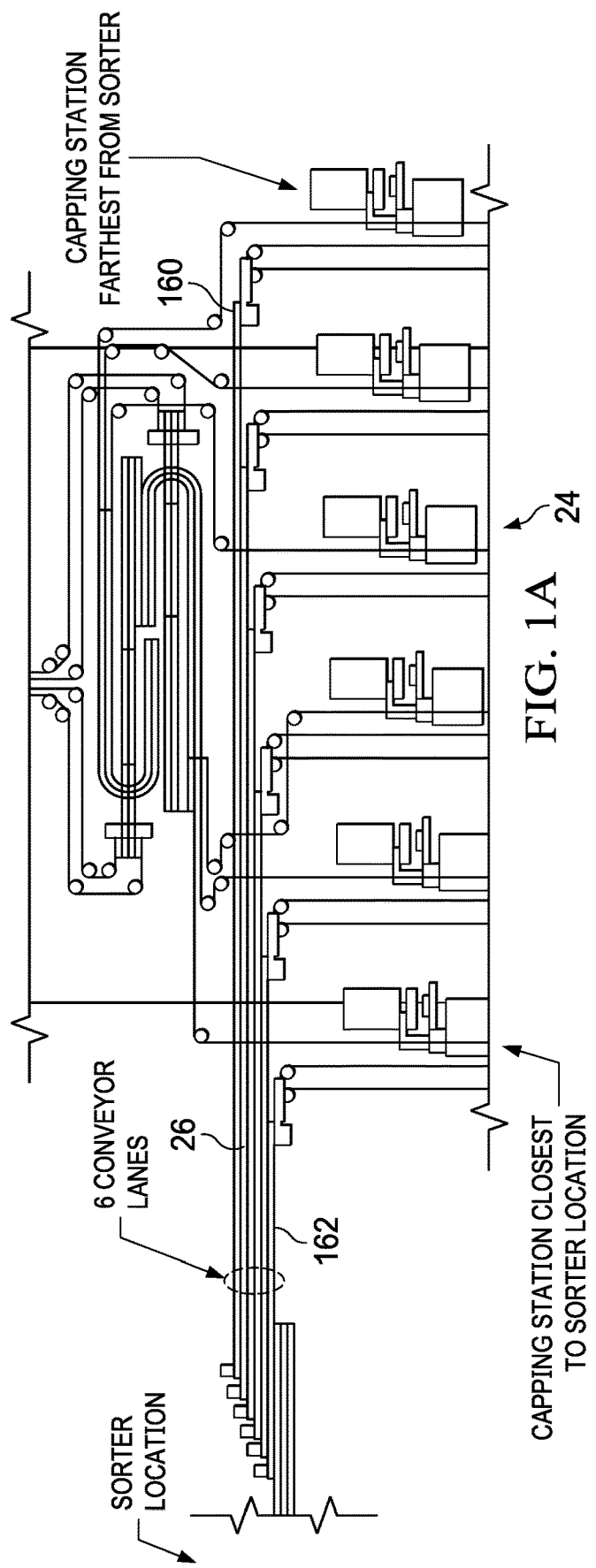
FIG. 1A illustrates a blown-up diagram of one embodiment of the vial conveyor combiner system.

FIG. 1A illustrates a diagram of one embodiment of the vial conveyor combiner system. As illustrated, there are six capping stations, each capping station outputs pucks/vials onto an outbound conveyor lane after the vial has been capped. Thus, with six capping stations, there are six outbound conveyor lanes for carrying pucks/vials from the capping stations to the sorter location. FIG. 1A shows the capping station farthest from the sorter location (or most upstream) on the right side of the FIGURE. The conveyor lane 160 carries pucks/vials from the capping station farthest from the sorter, past the other capping stations, and eventually to the sorter location. The sorter location is shown generally on the left side of the FIGURE. The capping station closest to the sorter location is also designated in FIG. 1A. This capping station feeds pucks/vials onto the conveyor lane 162 for transport to the downstream sorter location. Similarly, all of the other capping stations between the farthest and closest capping stations have outbound conveyors for transporting pucks/vials to the downstream sorter location. These six conveyor lanes traveling away from the capping stations are preferably arranged in a side-by-side (or adjacent) configuration.

In the preferred embodiment, the conveyor lane from the most upstream capping station (farthest from the downstream destination or sorter location) moves faster than the conveyor lanes from the more downstream capping stations ensuring that vials from the capping stations reach the downstream sorter location in close proximity to each other or preferably at approximately the same time. The system is preferably configured so that the farther the capping station is away from the sorter location, the faster its outbound conveyor lane will move.

In this embodiment, the outer lanes of the system are configured to move faster than the inside lanes so that the puck/vials leaving the capper stations are kept in closer proximity to one another. In one embodiment, the outermost conveyor lane moves six times faster than the innermost lane. Each lane moves faster than the one below it. This configuration assists in delivering vials of a multi-vial order to the sorter location in close proximity to each other to avoid vial congestion. This new combiner conveyor is a continuous flow system that allows for the elimination of hardware, controls and associated programming required in traditional systems.

Figure 1B:
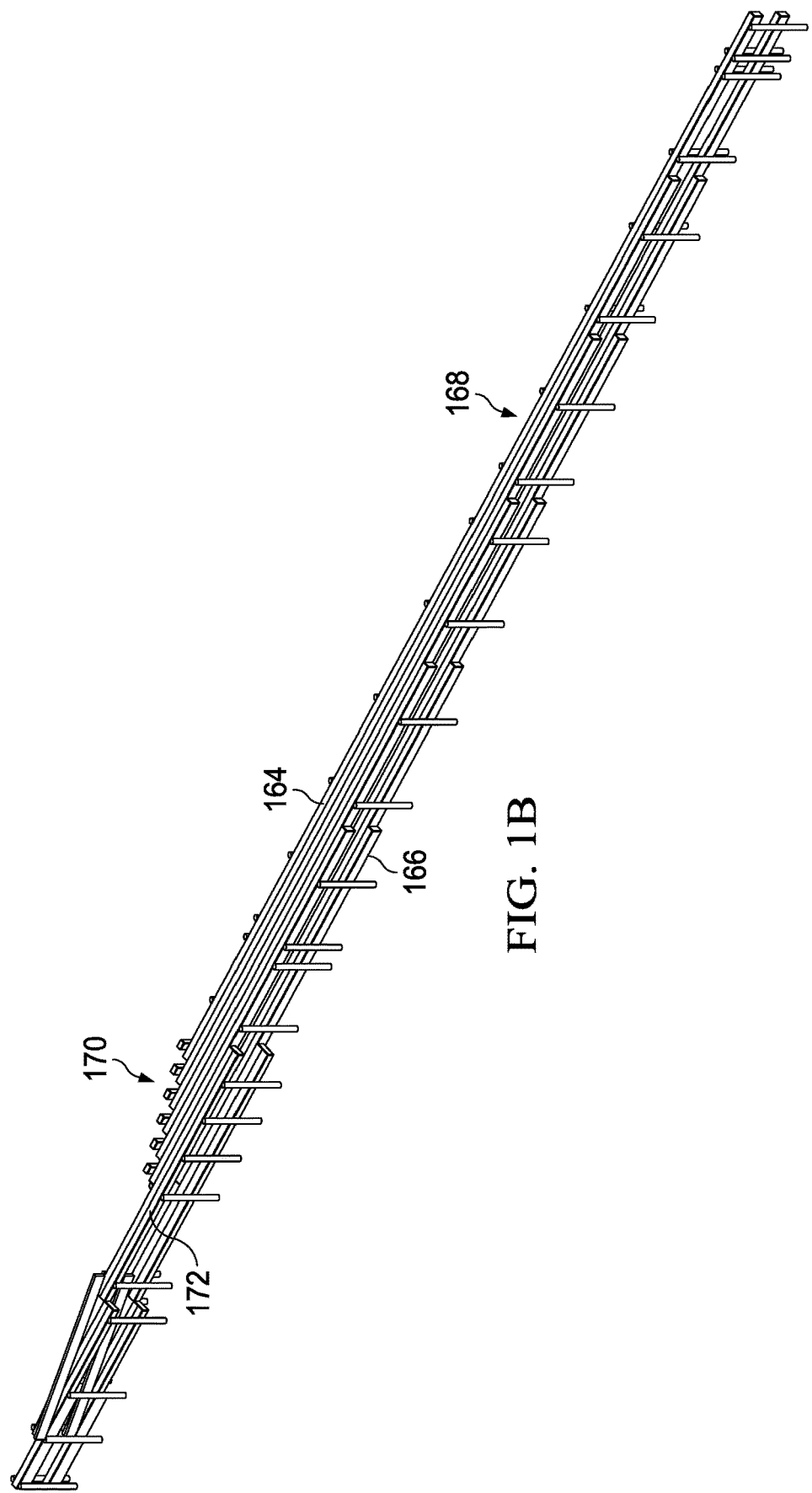
FIG. 1B illustrates an embodiment of the present invention with two vial conveyor combiner systems in a stacked configuration.

FIG. 1B illustrates a perspective view of an embodiment of the present invention with two vial conveyor combiner systems in a stacked configuration (e.g., top 164 and bottom 166). In this embodiment, each capping station has two outbound conveyor lanes—one outbound conveyor lane feeding vials/pucks to the top vial conveyor combiner system, and the second outbound conveyor lane feeding vials/pucks to the bottom vial conveyor combiner system. The stacked vial conveyor combiner system transports vials to two sorters also arranged in a stacked configuration. The top vial conveyor combiner system transports vials (or bottles) to a top sorter and the bottom vial conveyor combiner system transports vials to a bottom sorter. This arrangement increases the capacity of the system allowing more prescriptions to be filled and mailed by the system in a shorter period of time.

As the vials leave the capping stations, the vials move from a distal portion, shown generally at 168, of the vial conveyor combiner system (farther away from the sorter location) to a proximal location, shown generally at 170. At the proximal location, plastic barriers, rails, or guides 174 are placed at an angle to the traveling axis of the conveyors to divert or guide the vials/pucks moving on the six conveyor lanes to a single conveyor lane 172. The single conveyor lane transports all of the vials/pucks output from the capping stations to the sorter location. In other words, all the vials/pucks transported via the six outbound lanes of the vial conveyor combiner system are combined onto the single conveyor lane 172 (or combined lane).

Figure 1C:
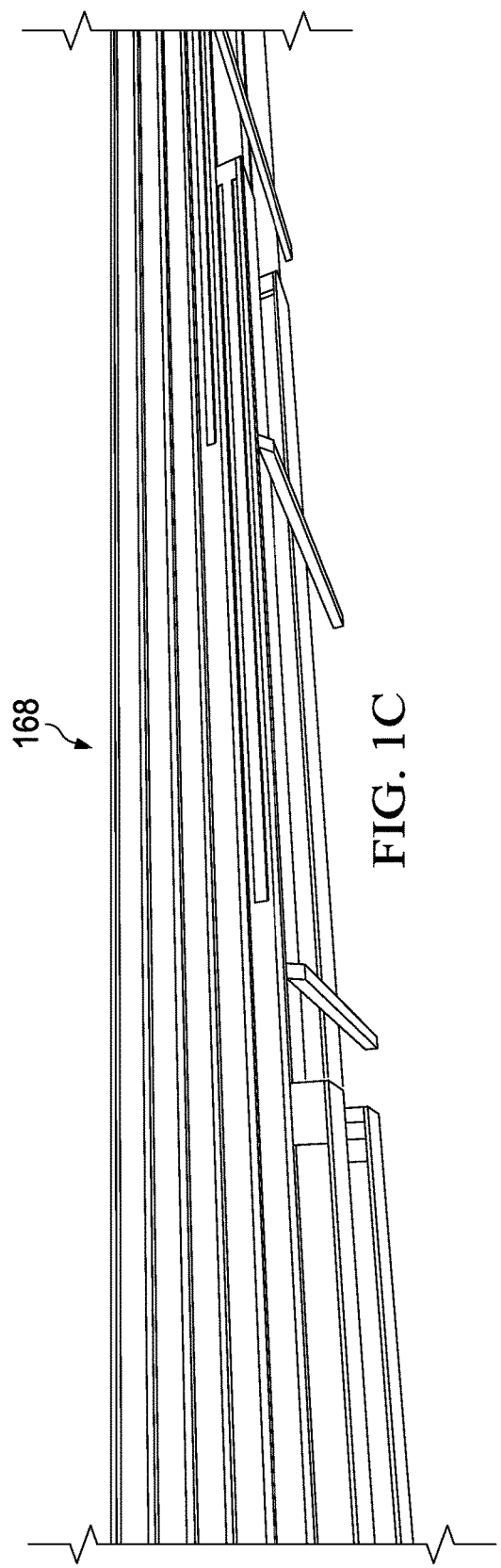
FIG. 1C illustrates a top view of one embodiment of the distal portion of the vial conveyor combiner system.
Figure 1D:
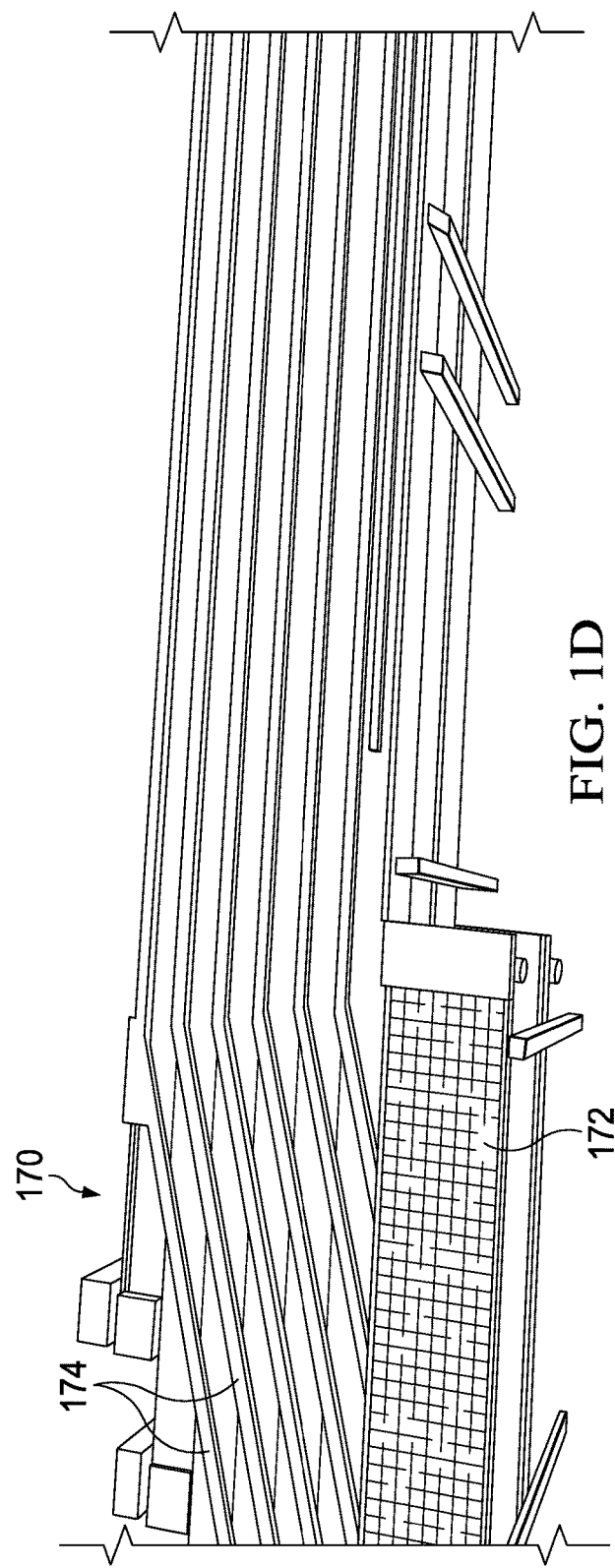
FIG. 1D illustrates a top view of one embodiment of the proximal portion of the vial conveyor combiner system.

FIG. 1C illustrates a top view of one embodiment of the distal portion of the vial conveyor combiner system. FIG. 1D illustrates a top view of one embodiment of the proximal portion of the vial conveyor combiner system.

While certain embodiments of the present invention are described in detail above, the scope of the invention is not to be considered limited by such disclosure, and modifications are possible without departing from the spirit of the invention as evidenced by the following claims.

What is claimed is:

1. A vial conveyor system for transporting vials from multiple upstream locations to a downstream location, the vial conveyor system comprising:
   a first upstream vial processing station;
   a second upstream vial processing station positioned next to the first upstream vial processing station;
   a third upstream vial processing station positioned next to the second upstream vial processing station;
   a first conveyor lane for transporting vials from the first upstream vial processing station to the downstream location;
   a second conveyor lane for transporting vials from the second upstream vial processing station to the downstream location;
   a third conveyor lane for transporting vials from the third upstream vial processing station to the downstream location;
   wherein the first, second, and third conveyor lanes are placed in a parallel arrangement with respect to each other;
   wherein the vial conveyor system is further comprised of:
   a single conveyor lane arranged so that the single conveyor lane moves in the same direction as the first, second, and third conveyor lanes;

a first guide member placed at an angle to the traveling axis of the first conveyor lane for diverting vials traveling on the first conveyor lane onto the single conveyor lane;

a second guide member placed at an angle to the traveling axis of the second conveyor lane for diverting vials traveling on the second conveyor lane onto the single conveyor lane;

a third guide member placed at an angle to the traveling axis of the third conveyor lane for diverting vials traveling on the third conveyor lane onto the single conveyor lane; and wherein the first conveyor lane travels faster than the second conveyor lane and wherein the second conveyor lane travels faster than the third conveyor lane.

2. The vial conveyor system according to claim 1, wherein the downstream location is the location where the first, second, and third conveyor lanes combine down to the single conveyor lane.

3. The vial conveyor system according to claim 1, wherein the downstream location is in the direction that the first, second, and third conveyor lanes are transporting vials.

4. The vial conveyor system according to claim 1, wherein the first, second, and third upstream vial processing stations are capping stations for putting caps on vials.

5. The vial conveyor system according to claim 1, wherein the single conveyor lanes is comprised of a plurality of conveyor segments interlocked together.

6. The vial conveyor system according to claim 1, wherein the single conveyor lanes is comprised of a plurality of conveyor lanes interlocked together.

7. The vial conveyor system according to claim 1, wherein the first conveyor lane travels three times faster than the third conveyor lane.

8. An object conveyor system for transporting objects from multiple upstream locations to a downstream location, the object conveyor system comprising:

a first upstream object processing station;

a second upstream object processing station;

a third upstream object processing station;

a first conveyor lane for transporting objects from the first upstream object processing station to the downstream location;

a second conveyor lane for transporting objects from the second upstream object processing station to the downstream location;

a third conveyor lane for transporting objects from the third upstream object processing station to the downstream location;

wherein the first, second, and third conveyor lanes are placed in a parallel arrangement with respect to each other;

wherein the object conveyor system is further comprised of:

a single conveyor lane arranged so that the single conveyor lane moves in the same direction as the first, second, and third conveyor lanes;

a first guide member placed at an angle to the traveling axis of the first conveyor lane for diverting objects traveling on the first conveyor lane onto the single conveyor lane;

a second guide member placed at an angle to the traveling axis of the second conveyor lane for diverting objects traveling on the second conveyor lane onto the single conveyor lane;

a third guide member placed at an angle to the traveling axis of the third conveyor lane for diverting objects traveling on the third conveyor lane onto the single conveyor lane;

wherein the first conveyor lane travels faster than the second conveyor lane;

wherein the second conveyor lane travels faster than the third conveyor lane.

9. The object conveyor system according to claim 8, wherein the single conveyor lane moves objects toward a sorter location.

10. The object conveyor system according to claim 8, where the first, second, and third guide members are plastic rails.

11. The object conveyor system according to claim 8, wherein the traveling axis is the line drawn towards the direction the first, second, third, and fourth conveyor lanes are traveling in.

12. The object conveyor system according to claim 8, where the speeds of the first, second, third, and fourth conveyor lanes are configured so that objects leaving the first, second, third, and fourth upstream object processing stations arrive at the downstream location at approximately the same time.

* * * * *